United States Patent [19]

Mate

[11] Patent Number: 4,884,206

[45] Date of Patent: Nov. 28, 1989

[54] PROCESS AND PROCESSING CIRCUIT FOR THE ANALOG OUTPUT SIGNAL OF A SENSOR

[75] Inventor: Jean-Luc Mate, Toulouse, France

[73] Assignee: Bendix Electronics S.A., Toulouse, France

[21] Appl. No.: 218,510

[22] Filed: Jul. 1, 1988

Related U.S. Application Data

[63] Continuation of Ser. No. 807,062, Dec. 6, 1985, abandoned.

[30] Foreign Application Priority Data

Dec. 21, 1984 [FR] France ................................ 84 19620

[51] Int. Cl.⁴ ............................................. F02D 41/04
[52] U.S. Cl. ............................ 364/431.08; 364/431.04; 123/425; 73/35; 73/117.3
[58] Field of Search ....................... 364/431.04, 431.08, 364/431.12, 733, 734; 123/415, 416, 419, 425, 435; 73/35, 117.3

[56] References Cited

U.S. PATENT DOCUMENTS

| | | | |
|---|---|---|---|
| 3,478,328 | 11/1969 | Schillinger | 340/172.5 |
| 4,023,019 | 5/1977 | Leibowitz et al. | 235/150.51 |
| 4,031,364 | 6/1977 | Wilmot | 235/151.3 |
| 4,054,786 | 10/1977 | Vincent | 364/575 |
| 4,185,325 | 1/1980 | Appel | 364/724 |
| 4,193,118 | 3/1980 | Nash et al. | 364/734 |
| 4,290,398 | 9/1981 | Hattori et al. | 123/425 |
| 4,300,503 | 11/1981 | Deleris et al. | 123/425 |
| 4,415,882 | 11/1983 | Akazawa et al. | 340/347 AD |
| 4,641,260 | 2/1987 | Fukukita et al. | 364/726 |
| 4,644,523 | 2/1987 | Horwitz | 375/115 |

FOREIGN PATENT DOCUMENTS

| | | | |
|---|---|---|---|
| 0146380 | 8/1984 | Japan | 364/726 |
| 2605335 | 8/1977 | Netherlands . | |
| 2007392 | 5/1979 | United Kingdom . | |
| 2046950 | 11/1980 | United Kingdom | 364/431.12 |

Primary Examiner—Parshotam S. Lall
Assistant Examiner—V. N. Trans
Attorney, Agent, or Firm—Russel C. Wells; George L. Boller

[57] ABSTRACT

This digital processing circuit or sequence includes means (10, 16) of sampling an analog signal and of converting the acquired samples into digital form, a shift register (25), means (23) of storing a value ($N_\xi$) of an integration constant, a unit (30), an accumulator (31) and a sequencer (14) which controls the sampling and the conversion into digital form of the samples by the said means during a measuring period, the storage of the said digital value representing the last sample acquired in the shift register (25), the operation of the said unit (30) as an adder during the measuring period for the computation of a cumulative sum and, at the end of the said period, the operation of the unit (30) as a subtractor and the operations of rotation of the content of the accumulator (31) in order to divide the final result of the cumulative sum by the value ($N_\xi$) of the integration constant.

4 Claims, 7 Drawing Sheets

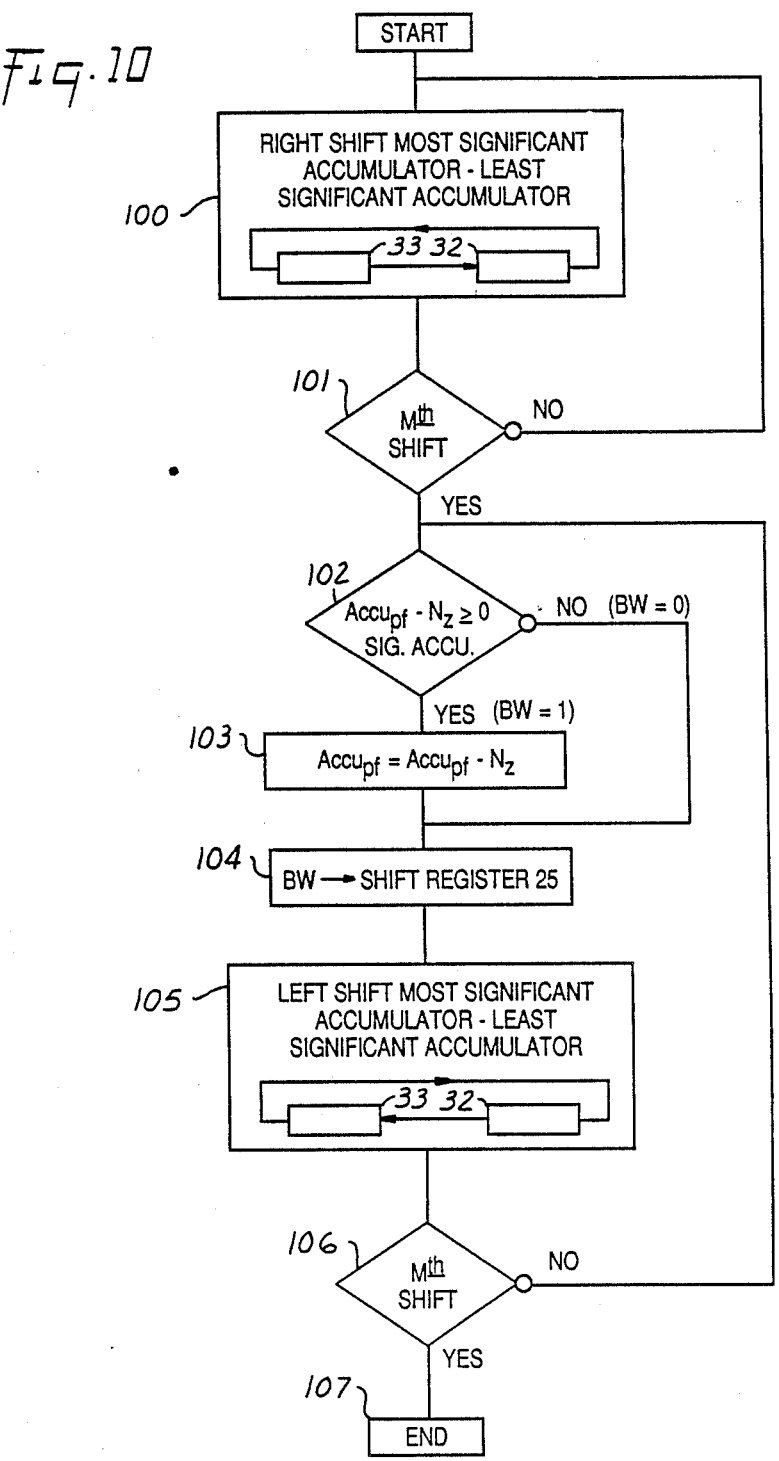

PROCESS AND PROCESSING CIRCUIT FOR THE ANALOG OUTPUT SIGNAL OF A SENSOR

This applition is a continuation of application Ser. No. 807,062 filed Dec. 5, 1985 now abandoned.

The present invention relates to a process and a processing circuit or sequence for the analog output signal of a sensor, in particular an accelerometric sensor used in a pinking or knocking detection system for an internal combustion engine.

BACKGROUND OF THE INVENTION

Pinking detection systems are being used more and more frequently on internal combustion engines as they enable, for a reference engine, the optimum adjustment of one or more functional parameters, in particular the ignition advance, the richness of the mixture and the supercharging pressure in the case of a supercharged engine, without having to use a safety margin due to the problems of deviations between engines, ageing or change of environment (ambient temperature, humidity, etc.).

Known pinking detection systems generally include a pinking sensor, such as an accelerometer mounted on the cylinder head of the engine, a processing and shaping sequence for the output signal of the accelerometric sensor, and an electronic circuit, such as a digital computer, which compares the useful signal coming from the processing sequence with a reference signal and delivers a pinking detection signal when the useful signal exceeds the reference signal by a predetermined value.

On the other hand, it is known that the pinking of an engine is likely to appear at the moment at which the pressure in the combustion chamber is maximum and that this phenomenon can only occur within a restricted angular window of the cycle depending on the engine and on its adjustment parameters.

This is the reason why the processing sequence of such a pinking system is adapted in order to take account of the output signal of the accelerometric sensor within an optimized angular window in order to give the best signal to noise ratio between an operating condition with pinking and an operating condition without pinking and, in particular, this window is chosen so that the valve closures which generate vibrations which could be interpreted incorrectly as pinking occur outside the window.

U.S. Pat. No. 4,300,503 issued Nov. 17, 1981, issued to Deleris et. al. and entitled "Process and System for Computation and Adjustment of Optimum Ignition Advance", describes such a processing sequence of analog type and is shown in block diagram form in FIG. 1 of the appended drawings. This processing sequence is inserted between a stage 2 of amplification and filtering of the output signal of an accelerometric sensor 1 and a digital computer 3 which provides the actual pinking detection. The processing sequence 4 includes an analog switch 5 controlled such that the output signal a of stage 2 is applied to a full-wave rectifying stage 6 during the measuring window. The signal a' applied to the input of stage 6 gives rise at the output of this stage to a signal b which is integrated by a stage 7 producing an integrated signal c. The integrated analog signal c is converted to a digital form d in an analog-digital converter 8 receiving a reference voltage Vref and it is this digital value d which is read by the computer 3. The signals a, a', b and c are shown in FIG. 2 of the appended drawings.

The transfer function of such an analog processing sequence can be expressed in the following way:

$$X = INT\left[\frac{\frac{1}{\xi}\int_{o}^{TFAC} ABS\,(Ve) \cdot dt}{V_{ref}} \cdot 2^N + M_o\right]$$

X is the result, converted into digital form, of the analog processing of the output signal of the accelerometric sensor, $\xi$ is the time constant of the integrator, TFAC is the duration of the measuring or analysis window, $V_{ref}$ is the reference voltage of the analog-digital converter, N is the number of significant bits of the converter and therefore of the result of the processing sequence, ABS (Ve) is the absolute value of the output signal of the accelerometric sensor 1 after shaping in the amplification and filtering stage 2, Mo is a constant associated with the integer part function INT [ ].

However, the discrete or integrated analog embodiment of a processing sequence, such as defined above, raises numerous problems.

First of all, it is difficult to produce an ultralinear full-wave rectifier because, as shown in FIG. 3 of the appended drawings, the rectification stage introduces, with respect to an ideal transfer function shown in dotted and dashed line, an offset error EO, a gain error Eg and a linearity error El when approaching saturation. In addition, the transient response of the rectifier is very dependent on the performance of the operational amplifiers used.

A second source of difficulties is associated with the integrator of which the accuracy of the time constant $\xi$=RC depends upon that of the R and C components used, an accuracy which is very difficult to guarantee to better than 10%. In addition, the variations in these components due to temperature and ageing do not allow this accuracy to be maintained throughout the operational lifetime. Finally, it is necessary to use a self-zeroing system in order to cancel the errors due to the integration of offset voltages and polarization currents in the amplifiers used, which complicates the implemented circuits.

A third problem encountered is that of determining the conversion time of the analog-digital converter in relation to the development of the integrated values stored in the capacity of the integrator.

Finally, the design of a traditional analog processing sequence is very delicate, considering the number of variables to be brought together and taken account of in each component in the sequence. Now it is important to produce such a design as the effect of temperature variations, in the context of the climatic environment specifications of automobile electronic, equipment has very great consequences in the permanence of the accuracy of the processing sequence.

SUMMARY OF THE INVENTION

The invention aims to produce a process and a digital processing sequence for the output signal of a sensor, in particular an accelerometric sensor, which enable, among other things, freedom from the problems mentioned above which are encountered with known analog sequences. Now, the standard digital computers in the current state of the art do not, because of their characteristics, make it possible to satisfy the requirements of flexibility, accuracy and signal processing speed at a cost that is compatible with a mass production application, as can be the case for processing the output signal of a pinking sensor for an automobile engine.

In order to solve these problems, the object of the invention is a process for processing the analog output signal of a sensor, in particular of an accelerometric sensor for the detection of pinking for an internal combustion engine, according to which a full-wave rectification and an integration of the said signal are carried out during a specified measuring period (TFAC) and a digital value (X) is delivered that is representative of the output signal of the sensor which is rectified and integrated over the measuring period, wherein the analog signal (Ve(t)) is sampled and converted into digital form during the measuring period (TFAC), a digital value representing the last sample acquired (x(i), x'(i)) is temporarily stored, that during the acquisition of the next sample, the said digital value (x(i), x'(i)) is added to the cumulative sum (y(i−1)) of the digital values representing the samples acquired since the start of the measuring period, the said storage and addition operations are repeated throughout the total duration of the measuring period (TFAC) and, at the end of that period, the result of the cumulative sum (Y) of the digital values (x(i), x'(i)) representing all the samples acquired during the measuring period (TFAC) is divided by a digital value (Nξ) representing the integration constant (ξ) of the output signal of the sensor, the quotient of the said division representing the said digital value (X).

According to one embodiment of the invention, each sample (x(i)) converted into digital form and temporarily stored is weighted by multiplying it by a coefficient (C(i)) and, during the acquisition of the next sample, the weighted digital value x'(i) of the said sample is added to the cumulative sum (y(i−1)) of the weighted digital values of the samples acquired since the start of the measuring period (TFAC).

Preferably, the weighting coefficient (C(i)) is equal to $2^{-j(i)}$, j(i) being an integer whose value depends on the position (i) of the sample concerned.

The invention also relates to a digital processing circuit or sequence for the implementation of the process defined above, characterized in that it includes means of sampling the analog signal and of converting the acquired samples to digital form, a shift register, means of storing the digital value (Nξ) of the integration constant (ξ), a conditional addition and subtraction unit connected to the shift register and to the storage means, an accumulator connected to the output of the said unit and a sequencer which controls the sampling and the conversion into digital form of the samples by the said means, the storage of the digital value (x(i), x'(i)) representing the last sample acquired in the shift register, the operation of the said unit as an adder during the measuring period (TFAC) determined for the computation of the cumulative sum (y(i)) and, in response to the detection of the end of the said period, the operation of the unit as a subtractor and the running of the operations of rotation of the content of the accumulator for dividing the final result (Y) of the cumulative sum by the digital value (Nξ) of the integration constant (ξ).

According to one embodiment of the invention, the means of sampling and of conversion into digital form, the shift register and the means of storage are interconnected with each other and with a first input of the unit by a first parallel-connection bus, the accumulator being connected to the second input of the unit by a second parallel-connection bus, the sequencer controlling, on each acquisition of a new sample during the measuring period (TFAC), the adding of the digital value (x(i), x'(i)) representing this sample stored in the shift register to the cumulative sum (y(i−1)) contained in the accumulator and, during the division operation by conditional subtraction and rotation of the content of the accumulator, the loading of the successive carriers (BW) produced by the unit during the said division operation at the serial loading input of the shift register which contains the said digital value (X) at the end of the division operation.

Preferably, the accumulator contains a least significant bits accumulator connected to the output of the unit and a most significant bits accumulator looped between each other by their serial inputs and outputs to enable the right and left shift operations under the control of the sequencer, the shift register, the means of storage, the least and most significant bits accumulators and the buses having a capacity of M bits, the sequencer being adapted to control the said division operation by controlling M right shifts of the content of the most and least significant bits accumulators and then the operation of the unit as a subtractor in order to compute the difference between the content of the least significant bits accumulator and the digital value (Nξ) of the integration constant, this difference becoming the new content of the least significant bits accumulator and a carry (BW) at logic "1" level being loaded into the shift register if the said difference is positive or zero and the content of the least significant bits accumulator remaining unchanged and a carry (BW) at logic "0" level being loaded into the shift register if the said difference is negative, this subtraction operation being followed by a left shift of the content of the most and least significant bits accumulators and being repeated under the control of the sequencer until M left shifts have been carried out, the said quotient (X) being then contained in the shift register.

Preferably, the sequencer is associated with means of selectively controlling the loading of the said carry (BW), at logic "1" level or at logic "0" level at the serial loading input of the shift register, the content of the said register being initialised at a first logic level before the division operation and an opposite logic level being loaded at its serial input during the first right and left shift of the content of the accumulators, the sequencer controlling the carrying out of the said right and left shifts until the detection of the said opposite logic level at the serial read output of the shift register.

DESCRIPTION OF THE DRAWINGS

Other characteristics and advantages of the invention will appear from the following description of one of its embodiments given solely by way of example and illustrated by the appended drawings in which:

FIG. 10 is an algorithm illustrating the final process of division implemented by the system in FIG. 4.

DETAILED DESCRIPTION

Figure 1:
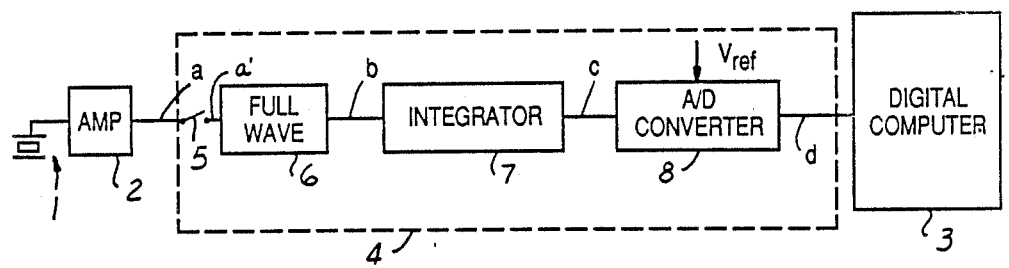
FIG. 1 is a block diagram of an analog processing sequence according to the prior art.
Figure 2:
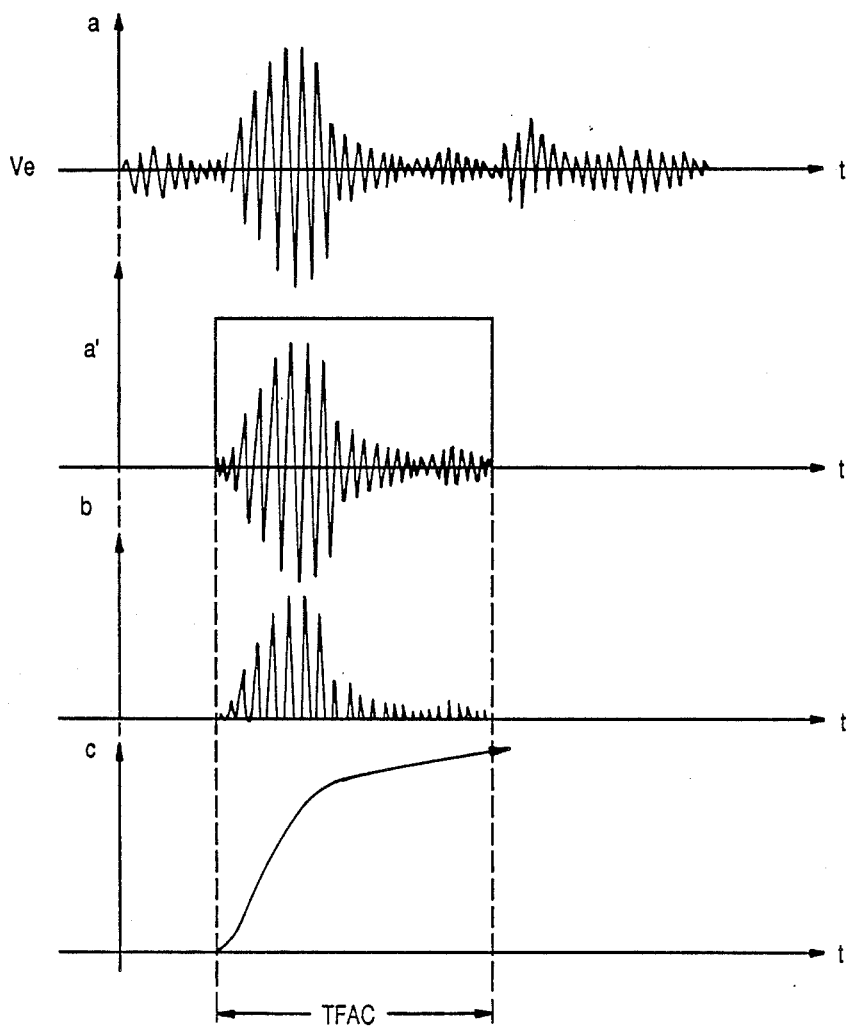
FIG. 2 shows the waveform of the signals present at various points in the sequence of FIG. 1.
Figure 4:
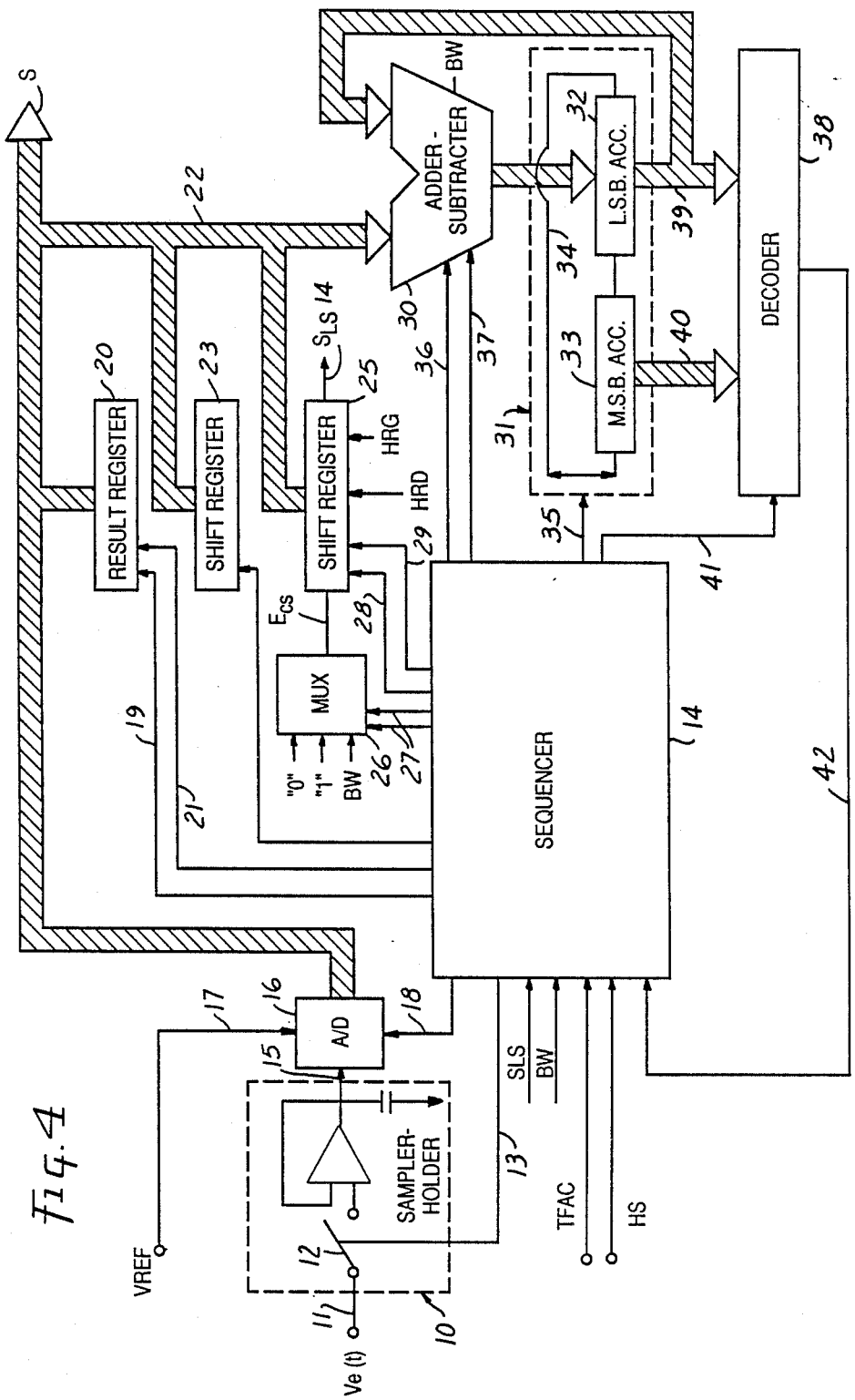
FIG. 4 is a block diagram of a digital processing system of the output signal of a pinking sensor.

The digital processing system shown in FIG. 4 is intended to be interposed between, on the one hand, an accelerometric sensor followed by its amplification and filtering stage and, on the other hand, a digital computer, like the analog processing sequence 4 in FIG. 1.

This digital system includes a sampler-holder 10 to the input 11 of which is applied the output signal of the accelerometric sensor, shaped and hereafter called Ve(t). The acquisition of samples of the signal Ve(t) is carried out by means of an analog switch 12 controlled by a sample acquisition signal 13 delivered by a sequencer 14 whose function is to deliver the succession of control signals necessary to each of the blocks in the sequence in order to carry out the chaining of the operations described in the following text. The sequencer 14 can be formed, for example, from a programmable logic network associated with a status register which will not be described in detail, such an arrangement being well known to specialists in the field.

The sequencer 14 receives a signal TFAC which defines the angular window within which the signal Ve(t) must be taken into account for the detection of pinking. This signal TFAC can be produced in a henceforth traditional way by a computer, for example an ignition computer, which can be the computer 3 in FIG. 1. The sequencer 14 also receives a clock signal Hs delivered by the computer 3 or by an external clock (not shown).

The output 15 of the sampler-holder 10 is applied to the input of an analog-digital converter 16 connected at 17 to a reference voltage source $V_{ref}$ which defines the coding range of the signal Ve(t) and at 18 to the sequencer 14 which delivers on its corresponding output a clock signal HCAN for the internal control of the analog-digital converter. The output of the analog-digital converter 16 is connected via an M-bit bus 22 to a result register 20.

Each sample x(i) resulting from the conversion into digital form of the signal Ve(t) is loaded, under the control 19 of the sequencer 14, from the converter 16 into the result register 20 where it is temporarily stored. The reading of the sample x(i), stored in the register 20, is controlled at 21 by the sequencer and is carried out on bus 22.

This bus is also connected to a register 23 in which a standardization or integration constant Nξ is stored the readout of which, on bus 22, is controlled at 24 by the sequencer 14.

The digital sequence includes a third register 25 which is used, among other things, for the scaling of the samples x(i).

This shift register 25 is connected to the bus 22 by its parallel loading inputs and by its parallel readout outputs controlled by the sequencer 14 at 28 and 29, respectively. The serial input Ecs of the register 25 is connected to a switcher or multiplexer 26 which selectively enables, under the controls 27 of the sequencer 14, the loading of the shift register 25 with the binary values "0", "1" or BW as will be described in more detail in the following text.

The M-bit bus 22 is connected to an input of a conditional adder-subtractor unit 30 whose output is connected to an accumulator 31. More accurately, the accumulator 31 includes a least significant bits accumulator 32 whose serial output is applied to a most significant bits accumulator 33. The accumulators 32 and 33 are connected to each other at 34 in such a way as to enable "right" or "left" rotations under the control, referenced 35, of the sequencer 14. The sequencer 14 also controls at 36 the operation of the unit 30 as an adder, and at 37, its operation as a conditional subtractor.

The output of the least significant bits accumulator 32 is, on the one hand, looped back to the second input of the conditional adder-subtractor 30 and, on the other hand, is applied to a decoder 38 by means of a bus 39. The decoder 38 is also connected to the most significant bits accumulator 33 by means of a bus 40 and it can be periodically reset under the control, referenced 41, of the sequencer 14. Finally, the output 42 of the decoder 38 is applied as an input to the sequencer 14.

The overall operation of the digital processing sequence will now be described with reference to FIGS. 4 to 7.

Figures 5A, 5B, 5C, 5D:
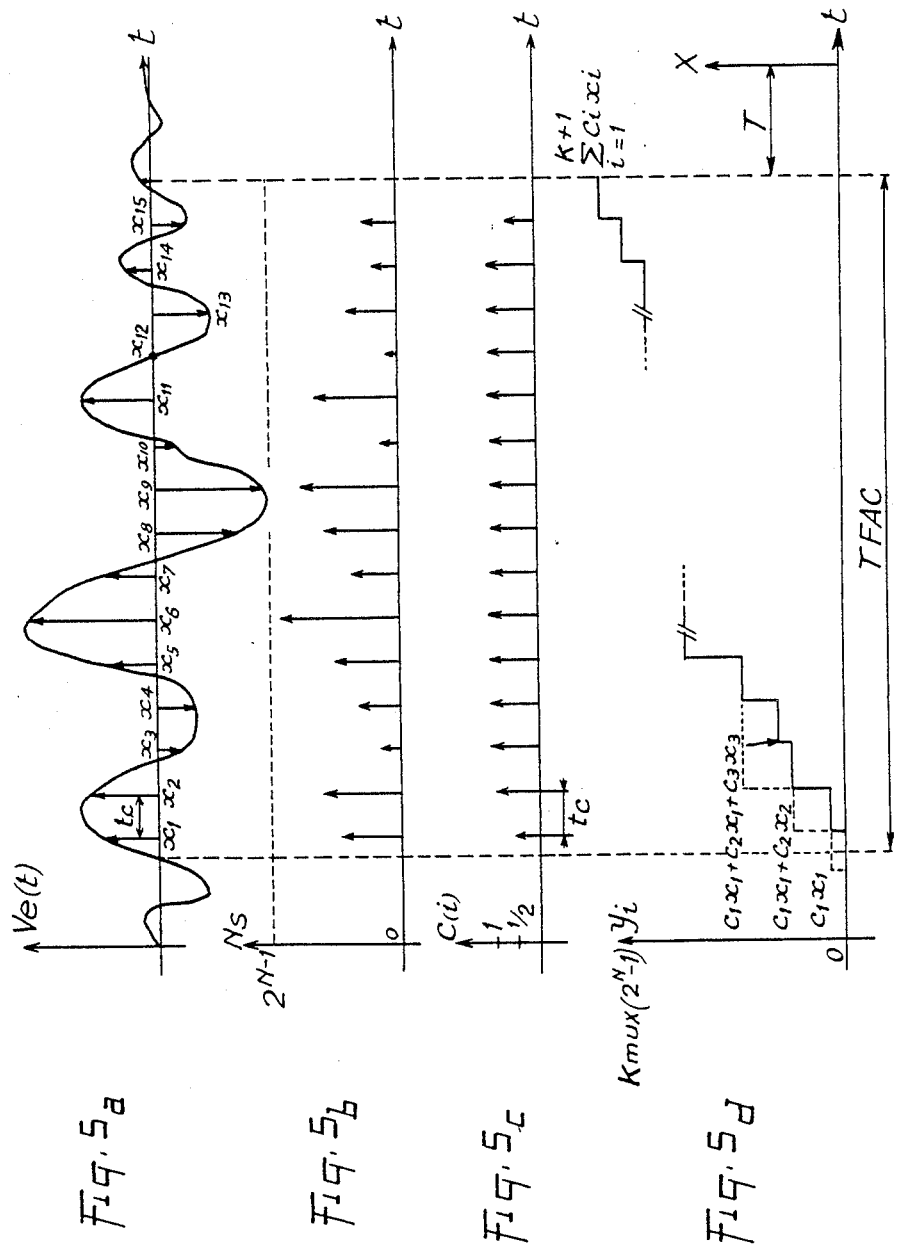
FIGS. 5a to 5d are diagrams illustrating the processing processes implemented by the system in FIG. 4.

As shown in FIG. 5a, the signal Ve(t) is sampled during the angular analysis window TFAC at a periodicity of tc and the collected samples are designated x1, x2, . . . xi. The periodicity tc is chosen such that the sample acquisition rate is fast enough to satisfy the overall system accuracy requirements.

The storage stage formed by the sampler-holder 10 preceding the analog-digital converter 16 satisfies the requirements for sampling the significant spectral components of the signal Ve(t). As a variant, the sampler-holder can of course be integrated with the analog-digital converter 16.

Figure 3:
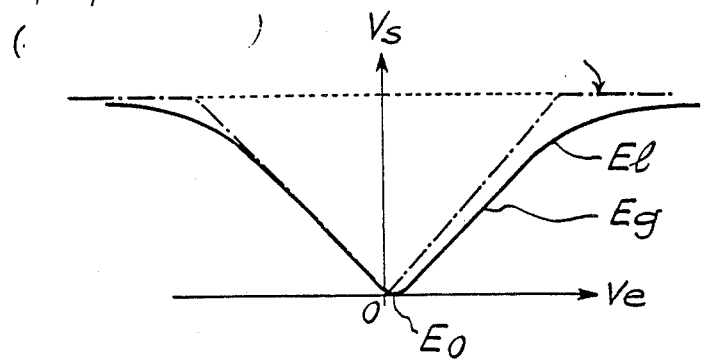
FIG. 3 is a diagram illustrating the transfer function of the full-wave rectifier in FIG. 1.

The latter has an N-bits + sign bipolar transfer function which, except for the quantification phenomenon, can ideally represent that of an ultra-linear fullwave rectifier. This transfer function, shown in FIG. 6, removes the undesirable effects of the non-linearity approaching saturation which result, in the case of an analog rectifier, in the linearity error El shown in FIG. 3. In fact, in the present case, the transfer function can be expressed mathematically and perfectly defined and, if ABS (Ve) $\geq V_{ref}$, the output code of the converter 16 is: $Ns = 2^{N-1}$.

Figure 6:
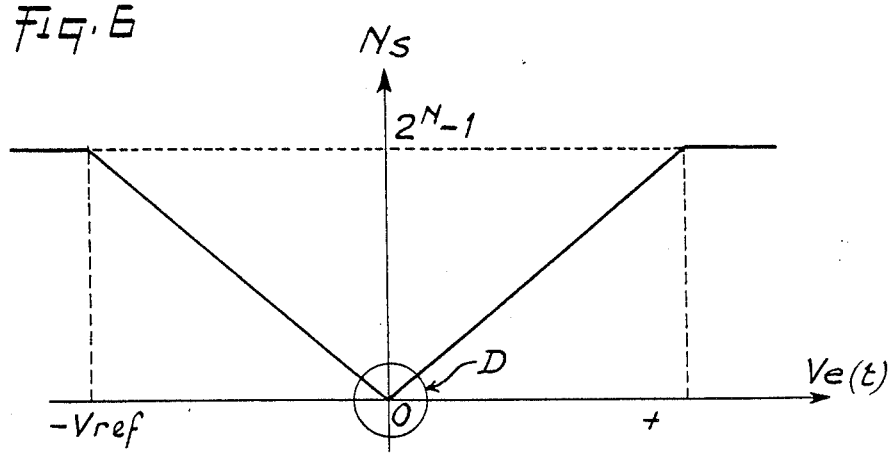
FIGS. 6 and 7 are equivalent views to FIG. 3 illustrating a transfer characteristic of the sequence comparable with a full-wave rectification.
Figure 7:
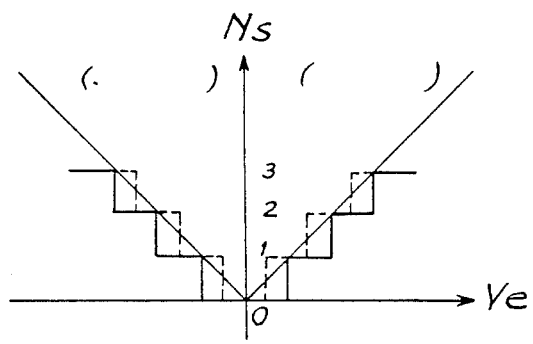

Moreover, as shown in FIG. 7 which is a larger scale view of the detail D in FIG. 6, the characteristic of the converter 16 can be modified by the standard means of adding an offset voltage (initial step function shown in full line; function with offset voltage shown in broken line), which enables a symmetrical quantization error function to be obtained.

The offset error of the converter in the neighbourhood of zero can be removed using the standard self-test or self-zero method that is well known to specialists in the field.

The number N of effective bits of the converter 16 is chosen according to the characteristics of the signal Ve(t) and the system accuracy requirements in order to obtain the required signal to noise ratio on input.

The digital result directly accessible at the output of the converter 16 is expressed as follows:

$$x(i) = INT\left[\frac{ABS(Ve(t=i\cdot tc))}{V\text{ref}} \cdot 2^N + N_o\right] \cdot \delta TFAC,$$

for ABS (Ve(t))<$V_{ref}$,
a formula in which:
x(i) is the digital value of the sample of index i representing the absolute value of the voltage;
INT [ ] represents the "integer part" function;
ABS (Ve(t=i.tc)) is the absolute value of the voltage of the signal Ve(t) stored by the sampler-holder 10;
tc is the sampling period;
$V_{ref}$ is the reference voltage applied to the converter 16;
$N_O$ is the centering constant of the quantization error which generally takes the value 0 or 0.5;
δTAFC=1 during the analysis window.
δTAFC=0 outside the analysis window.

The various samples x(i) collected and converted into digital form therefore result at the output of converter 16 in a code Ns which can have a maximum value of $2^N - 1$, as shown in FIG. 5b.

At the end of each sampling period tc, the sample x(i) is loaded into the result register 20. Before the arrival of the next sample x(i+1), the content x(i) of the result register 20 is transferred into the shift register 25, under the control of the sequencer 14, so that it can be scaled. For this purpose, each sample x(i) is multiplied by a weighting coefficient Ci such that $C(i)=2^{-j(i)}$, j(i) being an integer such that j(i) ϵ[O, N], so that each weighted or scaled sample x'(i) has the value:

$$x'(i) = x(i) \cdot C(i) = x(i) \cdot 2^{-j(i)}$$

FIG. 5c shows the values that can be taken by the weighting coefficients C(i): in this example C(i)=0.5 for the first and last samples and C(i)=1 for all the other samples. However, the coefficients C(i) can take other values and be distributed differently, as will be explained in more detail in the following text.

The scaling of the samples x(i) stored in the shift register 25 is carried out by making a number of right shifts of the content of the register 25 equal to j(i). The number j(i) can be stored in the sequencer 14 or in a permanent external Read Only Memory (ROM) (not shown) if necessary.

Each weighted sample x'(i) is then applied under the control of the sequencer 14 as an input to unit 30 which, during the course of the analysis window TFAC, is conditioned at 36 by the sequencer 14 to operate as an adder. The value of the weighted sample x'(i) is then summed with the existing content of the accumulator 31, applied to the other input of the adder 30 via the bus 39, and the result of this addition is again loaded into the accumulator 31 so that the development of the content of the accumulator can be expressed as follows:

$$y(i) = y(i-1) + x'(i) = C_1 x_1 + C_2 x_2 + \ldots C(i) x(i),$$

y(i) representing the result of the accumulation whose development during the course of the analysis window TFAC is represented in FIG. 5d. At the end of the analysis window TFAC, the processing sequence proceeds with the integration or scaling of the result of the accumulation:

$$X = INT\left[\frac{\sum_{i=1}^{K+1} x(i) 2^{-j(i)}}{N\xi} + M_o\right],$$

where:

$$K = INT\left[\frac{TFAC}{tc}\right], K+1$$

representing the maximum number of samples processed during the analysis window TFAC;
tc is the sampling period;
TFAC is the duration of the analysis window;
Nξ is the numerical value of the integration or analysis constant ξ stored in the register 23, a value which can be between 1 and the maximum capacity of the register 23 compatible with the accumulator 31;
$M_O$ is a constant that traditionally can have the values 0-0.5 or 1 and enabling the modification of the integer part function INT [ ];
X is the digital result of the processing of the signal supplied at the output of the sequence, at the end of a time T necessary for the division operation after the end of the analysis window TFAC (see FIG. 5d).

This integration or scaling operation on the result of the accumulation is carried out by means of the unit 30 controlled at 37 by the sequencer 14 in order to function as a conditional subtractor, the accumulator 31 using its left-right rotation facilities and the shift register 25 which, at the end of the operation, contains the result X of the digital processing of the signal Ve(t).

The implementation of this operation will be described in more detail in the following text, but it can be noted here and now that the accuracy of the integration and of the digital result X obtained at the output of the processing sequence depends only on the accuracy of the analog-digital converter 16, on the accuracy of the intrinsic value of the sampling period tc, and the maximum digital capacity of the accumulator 31.

Figure 8:
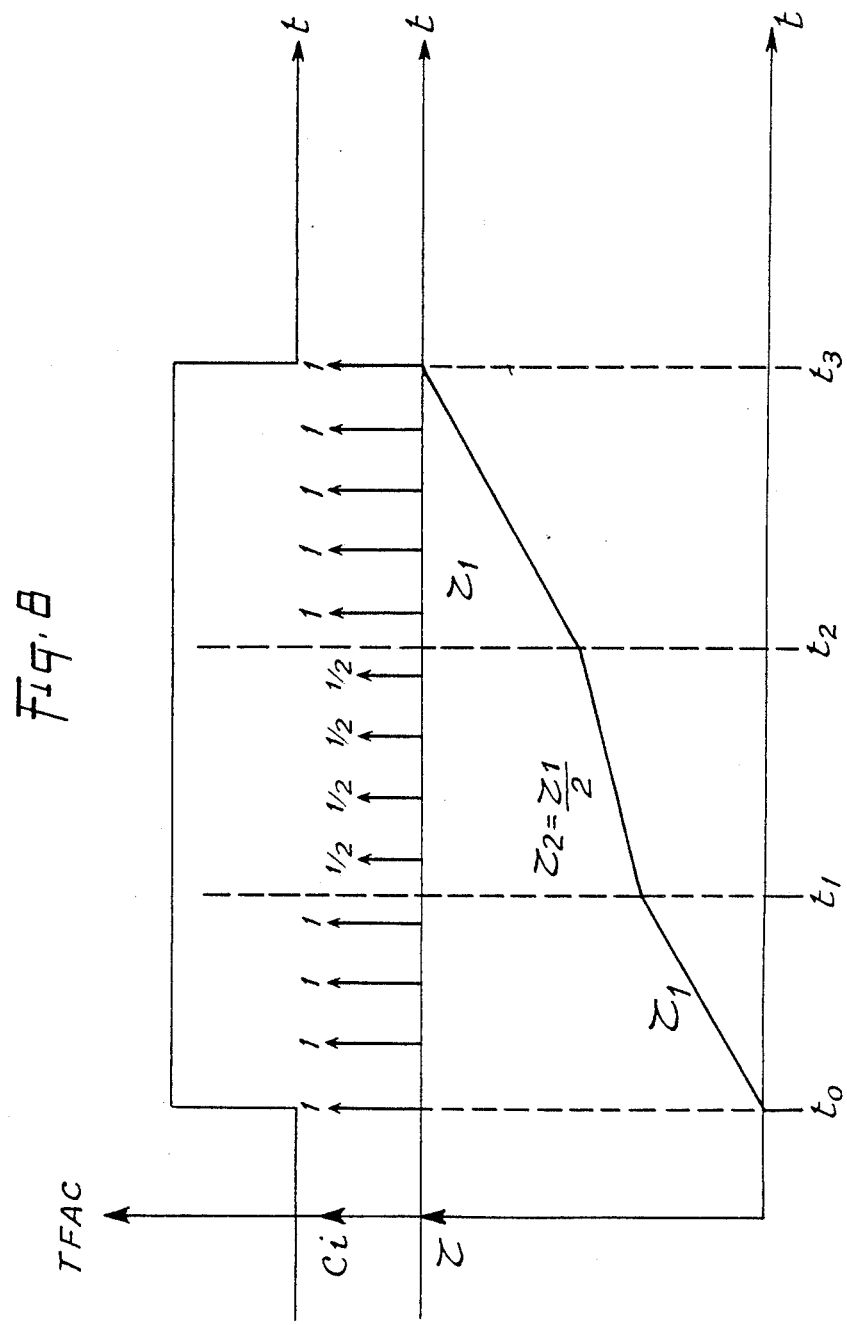
FIG. 8 is a diagram illustrating a functional mode of the sequence modifying the integration time constant during the measuring window.

Moreover, the facility for scaling the samples—$x'(i)=x(i)2^{-j(i)}$—can be used, in particular, for the taking into account of the values of particular samples (for example the initial value of the final value as shown in FIG. 5c) or for the modification of of the time constant ξ of the integrator during the analysis window TFAC. An example of this second possibility is shown in FIG. 8 in which:
between the start of the analysis window t0 and the time t1 the integration constant ξ has a first value $ξ_1$ as C(i)=1, or j(i)=0;
between times t1 and t2, the integration constant has a second value $ξ_2=(ξ_1/2)$ as C(i)=½, i.e. j(i)=1; and
between time t2 and the end t3 of the analysis window the integration constant ξ again has the value $ξ_1$ because C(i)=1, or j(i)=0.

This enables the easy attainment of more complex "analysis gate" functions, particularly trapezoidal, enabling the attenuation of certain spectral components of the signal Ve(t).

Certain special features of the functioning of the digital processing sequence according to the invention will now be described in more detail with particular reference to FIGS. 4 and 9.

The angular analysis window starts at time to where the TFAC signal goes from "0" to "1". As soon as the analysis window is "open", the sequencer transmits the clock signal Hs to the analog-digital converter 16 over the connection 18 where this signal is called HCAN. The first pulse of the clock signal Hs is also applied at 13, at time t1, to the sampler-holder 10 in order to acquire the first sample of the signal Ve(t). The sample acquired during the closure of the analog switch 12 by the signal 13, between times t1 and t2, is stored by the sampler-holder 10 whose output 15 develops as shown in FIG. 9. This sample is then converted into digital form in the converter 16 with the help of the clock signal HCAN between times t2 and t3: when N+1 pulses have been accounted for (N quantization bits+1 sign bit), the sequencer 14 sends on 19 a signal controlling the loading of the output code of the converter 16, representing the digital value x1 of the first sample, into the result register 20. Simultaneously, the value j(i) (j1 in the case of the first sample) is loaded into the sequencer 14 so as to control the number of right shifts of x1 that will be carried out in the shift register 25.

At the time t4 of appearance of a new pulse of the clock signal Hs, the sequencer 14 sends on 28 a pulse whose rising edge commands the loading of the content x1 of the result register 20 into the shift register 25 and generates on 13 a new sample acquisition signal. Also, if the value j(i) loaded at time t3 is not zero, the sequencer 14 also generates at time t4 the first of a series of right rotation clock pulses $H_{RD}$ the number of which is equal to j(i): each of these clock pulses $H_{RD}$ commands on its falling edge, i.e. at times t5, t6 and t7 respectively, a "right" shift of the content of the shift register 25. At the end t7 of this shift operation, the number present in the shift register 25 therefore represents the weighted digital value $x'(i)=x(i)\cdot 2^{-j(i)}$ of the sample.

Figure 9:
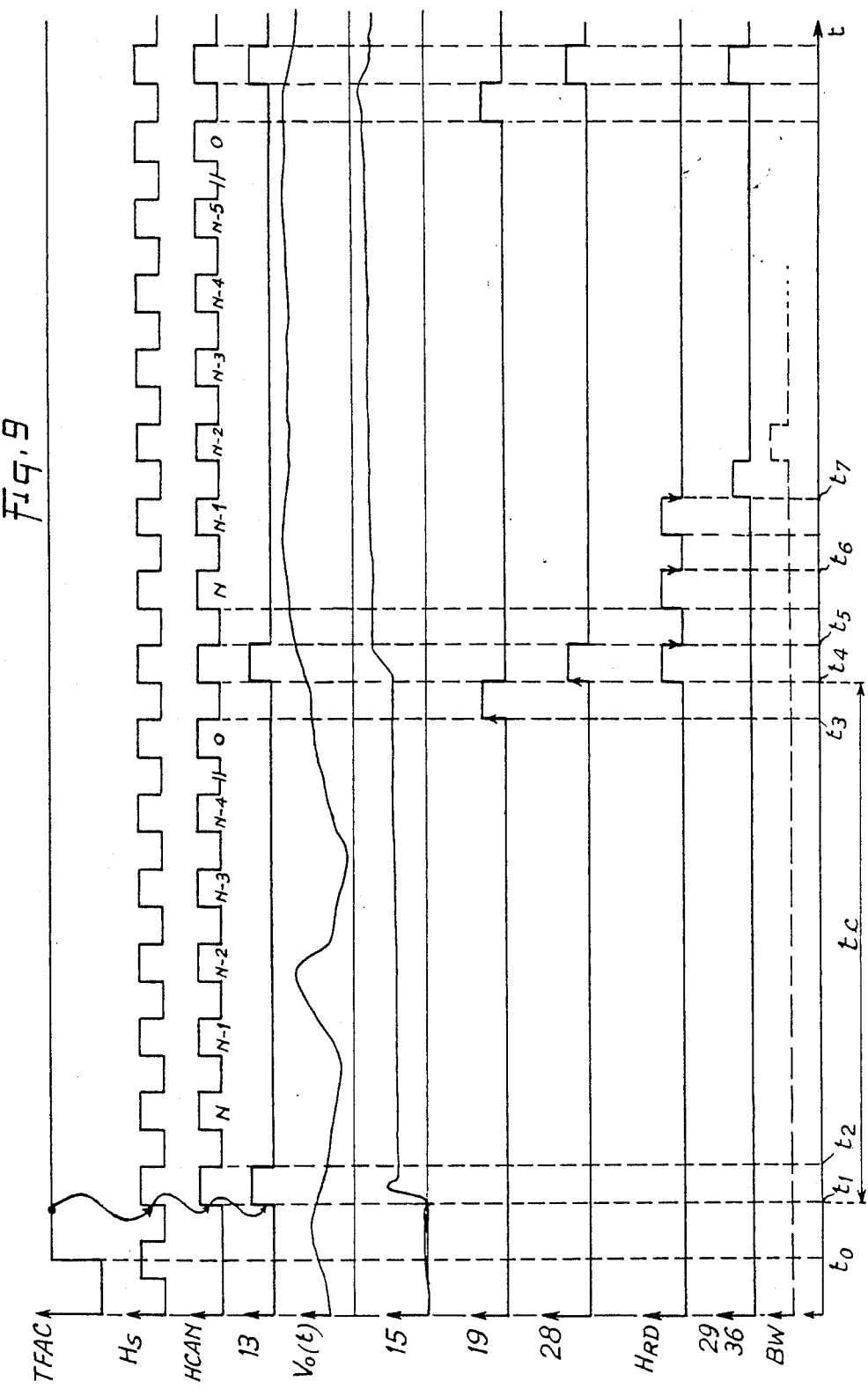
FIG. 9 is a timing diagram illustrating certain functional details of the digital system in FIG. 4.

The sequencer 14 then generates on 29 and 36 a pulse to command the readout of the content $x(i)\cdot 2^{-j(i)}$ of the shift register 25 and its summing with the preexisting content of the least significant bits accumulator 32. If this sum is greater than or equal to $2^N$, i.e. if:

The content of the least significant bits accumulator $+x'(i)\geq 2^N$, the carry BW of the adder 30 goes to "1" as shown in broken line in FIG. 9 and the most significant bits accumulator 33 is incremented by one unit:

Most significant bits accumulator=Most significant bits accumulator +1.

At the end of this operation, in the case of the ith sample, the overall content of the accumulator 31, formed from the least significant bits accumulator 32 and the most significant bits accumulator 33, is therefore as previously indicated:

$$y(i)=y(i-1)+x'(i)=y(-1)+x(i)\cdot 2^{-j(i)}$$

This process is repeated each time a sample is acquired during the entire duration of the analysis window TFAC except if the decoder 38, which was reset at the start of that window, prematurely sends an overflow signal on its OVF output, referenced 42 in FIG. 4. The decoder 38 has 2M inputs connected by the buses 39 and 40 respectively, each of M bits, to the least significant 32 and most significant 33 bits accumulators. The OVF output 42 goes to "1" if:

$$y(i)\geq(2^M-1)\cdot N_\xi$$

In this case, the accumulation of weighted samples x'(i) is interrupted by the sequencer 14 and the anticipated result of the digital processing of the signal Ve(t) is directly available:

$$X=2^M-1$$

Assuming that the accumulation process continues up till the end of the analysis window TFAC as shown in FIG. 5d, the final content of the accumulator 31 is:

$$Y = \sum_{i=1}^{K+1} C(i)\,x(i)$$

The sequencer 14 then starts the division operation to scale the result of the accumulation. This division operation is carried out using the shift register 25, the unit 30 and the accumulator 31 and proceeds according to the algorithm in FIG. 10, under the control of the sequencer 14.

The sequencer 14 firstly commands in stage 100 a "right" shift of the content of the most and least significant bits accumulators 32 and 33, both accumulators being looped as shown in this stage.

The next stage 101 is a test to determine if the contents of accumulators 32 and 33 have been shifted M times:
  if not, a return is effected to stage 100 and a new "right" shift is made;
  if so, M "right" shifts of the content of the accumulators have been made and the next stage 102 is proceeded to.

The counting of the M shifts of test 101 is carried out by the shift register 25: for this purpose, the content of this register is previously set to zero by the sequencer 14 through the multiplexer 26 and, at the first right shift of stage 100, a "1" is sent via the multiplexer 26 to the serial loading input Ecs of the least significant bit of register 25. At each "right" shift of the content of accumulators 32, 33, the sequencer 14 commands the rotation to the left of the shift register through the "left" rotation clock input $H_{RG}$ of the register 25. The serial read output $S_{LS}$ of the most significant bit of the register 25 is read by the sequencer 14 and, as long as this output is at "0", the sequencer 14 continues the "right" shifting of the accumulators 32 and 33 and the "left" shifting of the register 25. When the sequencer 14 detects a "1" at the output $S_{LS}$, it means that M "right" shifts of the accumulators 32 and 33 and M "left" shifts of the register 25 have been made since the capacity of the shift register 25 is M bits.

We now proceed to stage 102 which is a test in which we examine if: The content of the least significant bits accumulator- $N_\xi \geq 0$.

This operation is carried out by unit 30 operating as a conditional subtractor under the command applied to it at 37 by the sequencer 14, $N_{86}$ being read from the register 23 by the command 24. The result of this inequality is given by the logic level of the carry BW. The answer to test 102 is positive if BW="1" and negative if BW="0".

In the affirmative, if BW="1", stage 103 is moved on to, in which the content of the least significant bits accumulator 32 is updated by taking as its new content its previous content reduced by $N_{86}$, or:

Least significant Accumulator=Least significant accumulator $-N_\xi$

Most significant accumulator unchanged.

Now stage 104 is proceeded to in which we load BW, in this case equal to 37 1", at the serial loading input Ecs of the shift register 25.

If the answer to test 102 is negative, stage 104 is passed onto directly in which the value of BW, loaded at the Ecs input of the register 25, is "0".

The loading of BW of at the Ecs input of the register 25 is carried out by means of the multiplexer 26 under the control of the sequencer 14.

The next stage 105 consists in a "left" shift of the content of the most significant and least significant accumulators 33, 32, according to the loop shown in this stage.

A test 106 is then made on the number of "left" shifts that have taken place in stage 105:
if the number is less than M, we loop back to test 102;
if M "left" shifts have taken place, the division algorithm is completed and we pass on to stage 107 which marks its end.

The counting of the M "left" shifts in test 106 is carried out, like that of the M "right" shifts in stage 101, by the shift register 25. At the end of stage 101, the register 25 contains only "0's" and a "1" is loaded at its Ecs input. The "1" is then shifted each time a BW carry is loaded at the Ecs input and, when this "1" is read at the $S_{LS}$ output of the sequencer 14, this means that M "left" shifts of the content of the accumulators have taken place.

The quotient of the division, i.e.

$$X = INT\left[\frac{Y}{N_\xi}\right]$$

is then contained in the shift register 25 which has been loaded M times at its Ecs input with the logic value of BW determined by test 102.

In other words, at the end of the division operation the result X, representing the integrated digital value of the signal Ve(t) rectified during the analysis window, is directly available at the outputs of the shift register 25 for any digital computer programmed according to an algorithm for the detection of pinking.

The necessity of generating the best rounding of X can lead to an ultimate comparison of the remainder contained in the least significant bit accumulator with $N_\xi$, the integration constant, in order to obtain as a quotient of the division:

$$X = INT\left[\frac{Y}{N_\xi} + Mo\right]$$

wherein Mo is an adaptation constant.

The result of the above is that the sequence described makes it possible to process the output signal of a sensor by carrying out simple operations only, which require only a small number of inexpensive components. In particular, the processing process according to the invention does not require the carrying out of the division operation in real time which, in the current state of the art, would prove very difficult to achieve with low cost components and, consequently, having a low computing power. In fact, the obtaining of the desired accuracy for the digital processing of a pinking signal requires a relatively high sampling rate of the order of, for example, 100 KHz, or a sampling period tc of 10 µs. The obtaining of this accuracy is compatible with a coding of the result in 8 bits, but the standard 8-bit microcomputers currently available do not offer integrated analog-digital conversion capability at such a high sample acquisition rate. It should be noted that the analog-digital conversion techniques known at the present time are capable of apply solving the problem posed by the sampling rate and that a specialist in the field can place, on the same semiconductor chip, all of the components which form the digital processing sequence described, at a cost compatible with a mass production application.

The invention is, of course, not limited to the single embodiment described and numerous modifications of it can be made without falling outside its scope.

Thus, for example, the result register 20 is not essential in all envisaged applications: its presence is necessary if the readout of the output of the converter 16 is not synchronized with the converter's clock HCAN as in the described example, but takes place as soon as the result of the conversion is available at the output of the converter. The value of x(i) is then saved in the register 20 while waiting for the synchronous command that will transfer it into the shift register 25 for its possible scaling.

If the result register 20 is deleted, the successive approximations register forming the output of the analog-digital converter 16 is connected directly to the shift register 25 by the bus 22. The digital value of x(i) is then transferred directly from the converter 16 to the register 25, for example at time t3 instead of at time t4, the other signals of FIG. 9 being able to remain unchanged, with the exception of the command 19 which is naturally deleted.

In the same way, the weighting operation is optional and the digital values x(i) of the acquired samples can be accumulated directly in the accumulator 31.

What is claimed is:

1. A digital system for processing the analog output of a sensor, in particular of an accelerometric sensor for the detection of pinking for an internal combustion engine, wherein the analog output of the sensor is bi-polar and is characterized by an integration constant, said system comprising:
means for periodically generating a measuring period signal representing a measuring period for the analog output of the sensor;
sampling means for periodically sampling the analog output of the sensor during each measuring period to produce bi-polar analog output signals;
analog-to-digital converter means responding to the bi-polar analog output samples for producing corresponding uni-polar digital values;
accumulating means for summing the uni-polar digital values produced during each measuring period to produce a sum of the uni-polar digital values occurring during each measuring period;
means for dividing the sum of the uni-polar digital values occurring during each measuring period by the integration constant characterizing the sensor to produce, for each measuring period, a modifier value; and means for adjusting ignition timing of the engine as a function of such modifier values.

2. A digital system as set forth in claim 1 further including scaling means to produce a desired scaling of said uni-polar digital values.

3. A process for processing the analog output of a sensor, in particular of an accelerometric sensor for the detection of pinking for an internal combustion engine, wherein the output of the sensor is bi-polar and is characterized by an integration constant, said process comprising:

periodically generating a measuring period signal representing a measuring period for the analog output of the sensor;

periodically sampling the analog output of the sensor during each measuring period to produce bi-polar analog output samples;

converting the bi-polar analog output samples into corresponding uni-polar digital values;

summing the uni-polar digital values produced during each measuring period to produce a sum of the uni-polar digital values occurring during each measuring period;

dividing the sum of the uni-polar digital values occurring during each measuring period by the integration constant of the sensor to produce, for each measuring period, a modifier value; and adjusting the ignition timing of the engine as a function of such modifier values.

4. A process as set forth in claim 3 further including scaling the uni-polar digital values according to desired scaling factors prior to summing of the uni-polar digital values.

* * * * *